United States Patent Office 3,408,441
Patented Oct. 29, 1968

3,408,441
EPIPODOPHYLLOTOXIN-β-D-GLUCOSIDES AND DERIVATIVES THEREOF
Albert von Wartburg, Max Kuhn, Camilla Keller, and Jany Renz, Basel, Switzerland, assignors to Sandoz Ltd., also known as Sandoz, A.G., Basel, Switzerland
No Drawing. Filed Dec. 12, 1966, Ser. No. 600,718
Claims priority, application Switzerland, Dec. 14, 1965, 17,231/65
5 Claims. (Cl. 424—180)

ABSTRACT OF THE DISCLOSURE

This invention relates to epipodophyllotoxin-benzylidene-β-D-glucoside and to pharmaceutical compositions containing it, and also to epipodophyllotoxin-β-D-glucoside and to tetra - O-acetyl-epipodophyllotoxin-β-D-glucoside. The epipodophyllotoxin-benzylidene-β-D-glucoside is useful in the treatment of leukemia L–1210 of the mouse.

The present invention relates to a new glucoside and a process for its production.

The present invention provides epipodophyllotoxin-benzylidene-β-D-glucoside of Formula I.

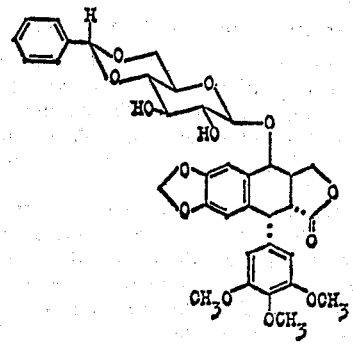

I

The present invention further provides the following two processes for the production of the compound of Formula I, characterized in that (a) epipodophyllotoxin-β-D-glucoside of Formula II

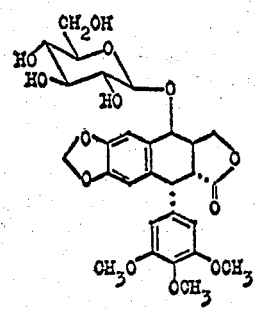

II is reacted with benzaldehyde in the presence of an acid catalyst, or (b) 4' - demethyl - epipodophyllotoxin-β-D-benzylidene-glucoside of Formula III

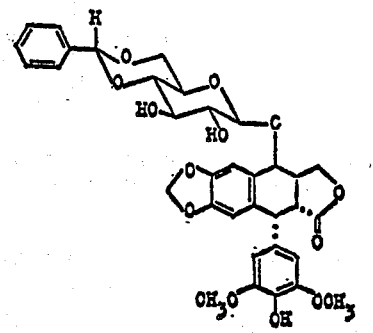

III is methylated with diazomethane.

One method of effecting the process indicated in (a) above consists in that epipodophyllotoxin-β-D-glucoside is dissolved directly in pure benzaldehyde and the acid catalyst is then added thereto. Examples of catalysts which may be used are Lewis acids, e.g. anhydrous zinc chloride, acids, e.g. p-toluenesulphonic acid, or a dried cation exchange resin which has sulphonic acid radicals in the $H^+$ form.

The reaction generally takes place at room temperature or at a slightly elevated temperature and is completed after 1 to 10 hours. At 20° C. the reaction is usually completed after 1 to 5 hours. The condensation product is isolated by taking the reaction mixture up in a water immiscible solvent, e.g. chloroform, shaking out several times with water to remove water-soluble salts and by-products, and then drying the organic phase. The dried organic phase is then concentrated by evaporation in a vacuum, whereupon most of the excess benzaldehyde is removed. An oily residue is obtained, from which the remaining benzaldehyde is readily removed by maceration or digestion of the condensation product with a suitable solvent, e.g. petroleum ether, pentane, hexane, or by chromatography on a neutral adsorption agent, e.g. silica gel. The condensation product is subsequently isolated and purified in manner known per se, e.g. by chromatography or reprecipitation.

One method of effecting the process indicated in (b) above consists in that 4'-demethyl-epipodophyllotoxin-β-D-benzylidene-glucose is disolved in an inert solvent, e.g. dioxane, to which some methanol is added, and a solution of diazomethane in ether is added at 0° to 30° C., preferably at room temperature, and the solution is allowed to react in the absence of light. The methylation is checked by thin layer chromatography. Working up is effected by removing the solvent in a vacuum and purifying the resulting material by chromatography.

Epipodophyllotoxin-β-D-glucoside (Formula II)

The starting material epipodophyllotoxin-β-D-glucoside (Formula II) is new and together with the process for its production, forms part of the present invention. It may be produced as follows:

Tetra - O - acetyl-epipodophyllotoxin-β-D-glucoside of Formula IV

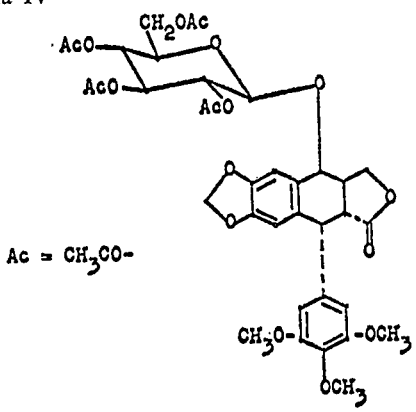

IV is subjected to alcoholysis in the presence of an anhydrous zinc salt, whereupon epipodophyllotoxin-β-D-glucoside results.

As it is known that lignan glucosides undergo epimerisation by the action of bases and that the action of acids leads to decomposition with the splitting off of the sugar radical, it was not to be expected that the free glucoside could be produced from tetra-O-acetyl-epipodophyllotoxin-β-D-glucoside by splitting off the acetyl radical.

It has now surprisingly been found that the splitting off of the acetyl radicals from tetra-O-acetyl-epipodophyllotoxin-β-D-glucoside may be effected without a simultaneous epimerisation of the aglucone at the C-3 atom and without a splitting of the sugar radical, by subjecting the compound to alcoholysis, preferably with methanol, in the presence of an anhydrous zinc salt, preferably zinc chloride or zinc acetate. When zinc chloride is used it is advantageous to add absolute pyridine, about 10 to 50% by weight of the amount of zinc salt (calculated on zinc chloride). Methanolysis is effected in anhydrous methanol at reflux temperature. The amount of catalyst used is about 20 to 50% by weight of the amount of tetra-O-acetyl-epipodophyllotoxin-β-D-glucoside used. The reaction period is 15 to 30 hours.

When zinc chloride is used as catalyst the solvents are evaporated in a vacuum after the reaction has been completed. The residue is dissolved in chloroform or a mixture of chloroform and butanol and the zinc salt is removed by shaking out with water. Crude epipodophyllotoxin-β-D-glucoside is obtained from the organic phase after concentrating by evaporation. The pure glucoside is obtained by recrystallizing the crude product several times from methanol/ether. Pure epipodophyllotoxin-β-D-glucoside forms colourless crystals having a melting point of 165–167° C.

Tetra-O-acetyl-epipodophyllotoxin-β-D-glucoside (Fordmula IV)

The tetra-O-acetyl-epipodophyllotoxin-β - D - glucoside (Formula IV) used for the production of epipodophyllotoxin-β-D-glucoside (Formula II) is also new and together with the process for its production forms part of the present invention. It may be produced as follows:

Epipodophyllotoxin of Formula V

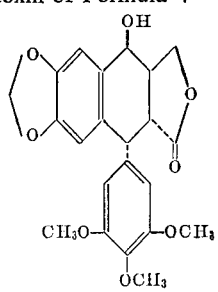

V is condensed with α-acetobromglucose of Formula VI

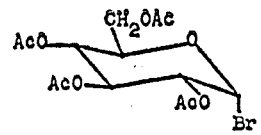

VI in an organic solvent which is inert under the reaction conditions and in the presence of zinc oxide or mercury oxide, or epipodophyllotoxin (Formula V) or podophyllotoxin of Formula VII

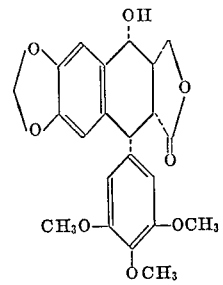

VII is condensed with 2,3,4,6 - tetra-O-acetyl-β-D-glucose of Formula VIII

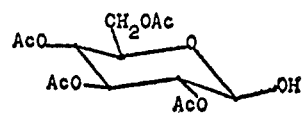

VIII in the presence of boron trifluoride ethyl etherate in an organic solvent which is inert under the reaction conditions at a temperature below 0° C.

Condensation with α-acetobromglucose

It was not possible to obtain this compound in a good yield from epipodophyllotoxin and α-acetobromglucose in the usual manner, e.g. under the conditions of the Koenigs-Knorr synthesis in benzene with the addition of a silver salt (e.g. Ag₂O or Ag₂CO₃) or in acetonitrile in the presence of mercury cyanide.

It was surprisingly found that tetra-O-acetyl-epipodophyllotoxin-β-D-glucoside may be obtained in a good yield by reacting epipodophyllotoxin with α-acetobromglucose in an organic solvent which is inert under the reaction conditions and in the presence of mercury-II-oxide or preferably zinc oxide.

One preferred method of effecting this process consists in that epipodophyllotoxin is reacted with α-acetobromglucose in a suitable solvent, e.g. ethylene chloride or preferably acetonitrile, at a temperature of 20° to 80° C., preferably at 40° to 70° C., in the presence of mercury-II-oxide or preferably zinc oxide. The reaction period, which depends on the temperature, concentration of the starting materials and grain size of the metal oxide, ranges from 0.5 to 12 hours. A 2- to 4-fold molar excess of α-acetobromglucose is used in order to obtain a high yield of tetra-O-acetyl-epipodophyllotoxin-β-D - glucoside during the glucosidation. The metal oxide is used in the same molar amount as α-acetobromglucose. The initial concentration of epipodophyllotoxin in the solvent should be between 5 and 20% by weight. The reaction under these conditions is completed after 40 to 60 minutes.

Tetra-O-acetyl-epipodophyllotoxin-β-D-glucoside is isolated by filtering off the excess metal oxide, distilling off most of the solvent in a vacuum, and washing the residue with sodium bromide solution to remove mercury salts or with water/methanol (9:1) to remove zinc salts. Most of the decomposition product is removed from the excess α-acetobromglucose by subjecting the reaction mixture to preliminary chromatography or by extracting with 5 to 30% aqueous ethanol at an elevated temperature. For further purification the main fractions are chromatographed once again or the ethanol-insoluble residue is chromatographed on silica gel. The resulting tetra-O-acetyl-epipodophyllotoxin-β-D-glucoside is obtained in pure form by crystallization from methanol.

Condensation with 2,3,4,6-tetra-O-acetyl-β-D-glucose

It has surprisingly been found that the reaction of 2,3,4,6-tetra-O-acetyl-β-D-glucose in the form of its pure β-anomer, with the readily obtainable podophyllotoxin or with epipodophyllotoxin, in the presence of boron trifluoride ethyl etherate at a temperature below 0° C., in a solvent which is inert under the reaction conditions, yields tetra-O-acetyl-epipodophyllotoxin-β-D-glucoside in a high yield, in which case the final product may be readily isolated with a high degree of purity. It should be noted that the configuration of the OH radical on the C-1 atom of the aglucone is of no importance, in that, irrespective of whether podophyllotoxin or epipodophyllotoxin is used as starting material, the epipodophyllotoxin glucoside is always obtained.

In the light of what was hitherto known it was not possible to foresee that practically only the β-glucoside compound would result as final product in the reaction described above. It could also not be foreseen that the readily affected 2,3,4,6-tetra-O-acetyl-β-D-glucose would not undergo an anomerisation or only a slight anomerisation to the α-anomer under the indicated reaction conditions, especially in the presence of boron trifluoride ethyl etherate. It is furthermore surprising that the reaction of 2,3,4,6 - tetra - O - acetyl-β-D-glucose, in the presence of boron trifluoride ethyl etherate, with podophyllotoxin or with epipodophyllotoxin leads to the same final product, i.e. almost exclusively tetra-O-acetyl-epipodophyllotoxin-β-D-glucoside. Only traces of the corresponding glucoside of podophyllotoxin are formed.

One preferred method of effecting the process consists in that boron trifluoride ethyl etherate is added at −10° to −25° C. to a solution or suspension of epipodophyllotoxin or podophyllotoxin and 2,3,4,6-tetra-O-acetyl-β-D-glucose in a solvent which is inert under the reaction conditions, e.g. ethylene chloride, chloroform or methylene chloride. In order that the valuable aglucones may react quantitatively, 1.5 to 3 mols of 2,3,4,6-tetra-O-acetyl-β-D-glucose and 2 to 4 mols of boron trifluoride ethyl etherate are used for every mol of aglucone. The initial concentration of epipodophyllotoxin or podophyllotoxin in the solvent should be approximately 25 to 40%.

Tetra-O-acetyl-epipodophyllotoxin-β-D-glucoside is isolated by inactivating the boron trifluoride ethyl etherate by the addition of a tertiary organic base, preferably pyridine, and the boron trifluoride/pyridine complex is subsequently washed out with water and the residue obtained after concentration is first crystallized from a mixture of ethanol/water (7:3) and then once or twice from pure ethanol or methanol.

The 4'-demethyl-epipodophyllotoxin-β-D-benzylideneglucoside (Formula III) used as starting material in process (b) above is also new.

It may be obtained as follows: 4'-demethyl-epipodophyllotoxin of Formula IX

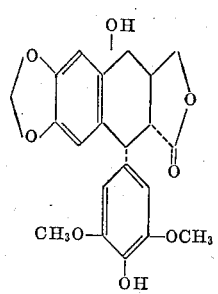

is reacted with chloroformic acid benzyl ester to give 4'-carbobenzoxy - 4' - demethyl - epipodophyllotoxin of Formula X

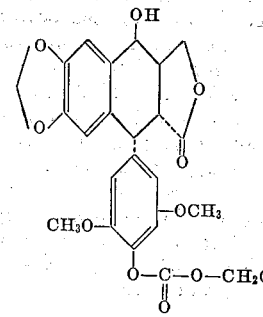

(see Example 5), this is reacted with 2,3,4,6-tetra-O-acetyl-β-D-glucose in the presence of boron trifluoride ethyl etherate, the carbobenzoxy radical is removed from the resulting tetra-O-acetyl-4'-carbobenzoxy-4'-demethyl-epipodophyllotoxin-β-D-glucoside of Formula XI

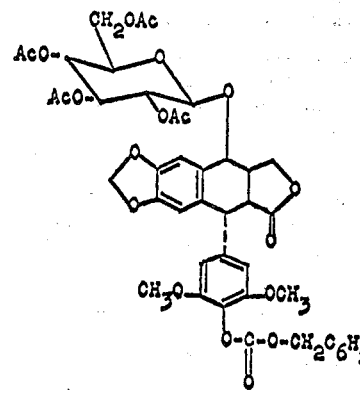

(see Example 6), the resulting tetra-O-acetyl-4'-demethyl-epipodophyllotoxin-β-D-glucoside of Formula XII

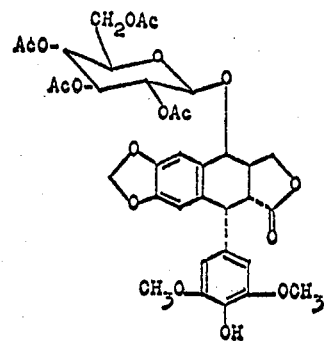

is deacetylated by methanolysis in the presence of zinc acetate (see Example 7) and the resulting 4'-demethyl-epipodophyllotoxin-β-D-glucoside of Formula XIII

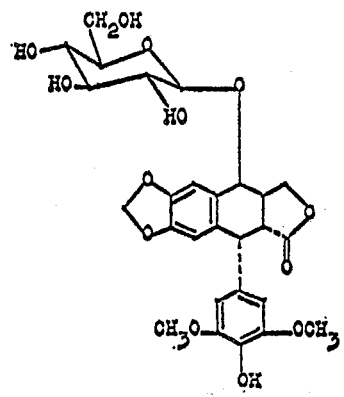

is reacted with benzaldehyde in the presence of an acid catalyst, e.g., anhydrous zinc chloride (see Example 8).

Epipodophyllotoxin - benzylidene-β-D-glucoside has a high cytostatic effect in vitro on mastocytoma cells and fibroblast cultures. The said compound furthermore is distinguished by a strong effect towards experimental tumours, especially leukemia L–1210 of the mouse.

The daily dose of Compound I ranges from 1 to 50 mg.

Compound I may be used as pharmaceutical on its own or in the form of appropriate medicinal preparations for administration, e.g., orally, enterally or parenterally. In order to produce suitable medicinal preparations the compound is worked up with inorganic or organic adjuvants which are inert and physiologically acceptable. Examples of such adjuvants are:

For tablets and dragées: lactose, starch, talc and stearic acid;

For syrups: solutions of cane sugar, invert sugar and glucose;

For injectable solutions: water, alcohols, glycerin and vegetable oils;

For suppositories: natural or hardened oils and waxes.

The preparations may furthermore contain suitable preserving, stabilizing and wetting agents, solubilizers, sweetening and colouring substances and flavourings.

The term "in manner known per se" as used herein designates methods in use or described in the literature on the subject.

In the following non-limitative examples all temperatures are indicated in degrees centigrade. The melting and decomposition points have been determined on a Kofler block.

EXAMPLE 1.—Tetra-O-acetyl-epipodophyllotoxin-β-D-glucoside 4.14 g. of epipodophyllotoxin and 12.50 g. of α-acetobromoglucose are mixed by stirring with 25 ml. of absolute acetonitrile in the presence of 2.45 g. of zinc oxide at 60° and in the absence of moisture. After every 10 minutes a sample is taken and examined by thin layer chromatography (silica gel/chloroform+10% of acetone). After all the α-acetobromoglucose has been converted (about 40–60 minutes after the reaction has commenced), cooling is effected to room temperature, dilution is effected with 50 ml. of chloroform, the unconverted zinc oxide is filtered off and the filtrate evaporated to a volume of about 20 ml. in a vacuum at 40°. The concentrate is taken up in 150 ml. of chloroform, is extracted five times, each time with 150 ml. of water/methanol (9:1) and after drying over sodium sulphate concentration is effected by evaporating in a vacuum. The residue is chromatographed on a 50-fold quantity of silica gel, whereby crude tetra-O-acetyl-epipodophyllotoxin-β-D-glucoside is eluted with chloroform containing 1% of methanol. The crude glucoside is chromatographed once more on a 60-fold quantity of silica gel, whereby chloroform containing 5% of acetone is used as eluant. The glucoside fractions crystallize, are crystallized twice from methanol and dried in a high vacuum, whereupon they yield pure tetra-O-acetyl-epipodophyllotoxin-β-D-glucoside having a melting point of 207–208° from methanol, $[\alpha]_D^{20}=-61.8°$ (c.=0.501 in CHCl$_3$).

EXAMPLE 2.—Tetra-O-acetyl-epipodophyllotoxin-β-D-glucoside 20.8 g. of epipodophyllotoxin are dissolved in 65 ml. of ethylene chloride whilst heating, the solution is cooled to +15° and after adding 31.5 g. of 2,3,4,6-tetra-O-acetyl-β-D-glucose stirring is effected at +15° for 5 minutes. Cooling is then rapidly effected to −15° in the absence of moisture, 17.5 ml. of boron trifluoride ethyl etherate (48% BF$_3$), which have been previously cooled to −10°, are then added dropwise during the course of 10 minutes whilst stirring and stirring is subsequently effected for a further hour. A solution of 17.5 ml. of absolute pyridine in 20 ml. of chloroform is subsequently added dropwise whilst cooling, dilution is effected with 300 ml. of chloroform and washing is effected five times, each time with 150 ml. of water. After drying the organic phase over sodium sulphate, concentration is effected by evaporating in a vacuum and the solvent is removed from the residue at 60° in a vacuum. 200 ml. of warm 70% ethanol are added to the resulting foam and the mixture is allowed to crystallize. The crystals are filtered with suction, washed with a small amount of 70% ethanol and subsequently recrystallized twice from pure ethanol, whereby uniform tetra-O-acetyl-epipodophyllotoxin-β-D-glucoside, having a melting point 207–208°, $[\alpha]_D^{20}=-61.8°$ (c.=0.051 in CHCl$_3$), results.

EXAMPLE 3.—Tetra-O-acetyl-epipodophyllotoxin-β - D-glucoside

Uniform tetra-O-acetyl-epipodophyllotoxin-β-D - glucoside is obtained in a manner analogous to that described in Example 2, from 16.6 g. of podophyllotoxin and 25 g. of 2,3,4,6-tetra-O-acetyl-β-D-glucose, by using 50 ml. of ethylene chloride, 14 ml. of boron trifluoride ethyl etherate, 14 ml. of absolute pyridine and 320 ml. of chloroform.

EXAMPLE 4.—Epipodophyllotoxin-β-D-glucoside 1.5 g. of tetra-O-acetyl-epipodophyllotoxin-β-D-glucoside, 500 mg. of anhydrous zinc chloride and 0.2 ml. of absolute pyridine are heated at reflux in 15 ml. of absolute methanol for 16 hours. The solution is subsequently concentrated in a vacuum to about 3 ml. is diluted with 50 ml. of chloroform, washed twice, each time with 10 ml. of water and the organic phase is concentrated in a vacuum after drying over sodium sulphate. After crystallizing the residue twice from methanol/ether epipodophyllotoxin-β-D-glucoside, having a melting point of 165–167°, $[\alpha]_D^{21}=-87°$ (c.=0.636 in methanol), is obtained.

EXAMPLE 5.—4'-carbobenzoxy-4'-demethyl-epipodophyllotoxin 60 g. of very finely pulverized 4'-demethyl-epipodophyllotoxin are suspended in 1000 ml. of anhydrous ethylene chloride and after the addition of 19 ml. of absolute pyridine cooling is effected to −10°. A solution of 34 g. of chloroformic acid benzyl ester in 100 ml. of ethylene chloride is added dropwise at −10° during the course of 2½ hours, whilst stirring and in the absence of moisture, and the mixture is allowed to react for a further half hour. The reaction solution is subsequently washed with water, the organic phase is dried over sodium sulphate, concentrated by evaporation in a vacuum and the residue is dried in a high vacuum at 70–80°. Crystallization of the crude product from acetone/ether and then twice from methanol yields 4'-carbobenzoxy-4'-demethyl-epipodophyllotoxin, having a double melting point of 117–119°/202–205°. The compound in its form free from solvent, having a melting point of 201–204°, $[\alpha]_D^{21}=-43.9°$ (c.=0.535 in CHCl$_3$), is obtained by drying in a high vacuum, first at 95–110° and then at 130° or by crystallizing from acetone/ether.

EXAMPLE 6.—Tetra-O-acetyl-4'-demethyl-epipodophyllotoxin-β-D-glucoside 26.8 g. of 4'-carbobenzoxy-4'-demethyl-epipodophyllotoxin are dissolved in 70 ml. of ethylene chloride whilst heating. The solution is cooled to +15° and 26.0 g. of 2,3,4,6-tetra-O-acetyl-β-D-glucose are added whilst stirring. As soon as the major portion of tetraacetyl-β-D-glucose has dissolved, cooling is rapidly effected to −11 to −12° (in the absence of moisture). Regardless of small amounts of undissolved starting material, 17.5 ml. of boron trifluoride ethyl etherate (48% BF$_3$) are then added dropwise at an internal temperature of −10° to −12° during the course of 10 minutes and stirring is subsequently effected at −10° for another 40 minutes. A mixture of 17.5 ml. of absolute pyridine and 35 ml. of ethylene chloride is then added dropwise whilst stirring and cooling and after the addition of a further 200 ml. of ethylene chloride shaking out is effected four times, each time with 100 ml. of water. The organic phase is dried over sodium sulphate and concentrated by evaporation in a vacuum and the residue dried at 70° in a high vacuum. The crude product is dissolved in 125 ml. of hot ethanol, 375 ml. of water are added whilst stirring and stirring is effected whilst cooling externally with ice water until the initially viscous and lumpy precipitate is converted into a sandy powder. The precipitate is then filtered with suction, washed with a mixture of ethanol/water (1:3) and dried in a high vacuum at 70°. This crude product is dissolved in 300 ml. of hot methanol, a small amount of undissolved flakes is filtered off and the filtrate is concentrated by evaporation in a vacuum. After drying the residue in a high vacuum at 70° tetra-O-acetyl-4'-carbobenzoxy-4'-demethyl-epipodophyllotoxin-$\beta$-D-glucoside is obtained as a white foam. $[\alpha]_D^{20}=-41.7°$ (c.=1.536 in $CHCl_3$). Further purification is effected by crystallizing from benzene/pentane or benzene/cyclohexane. Pure tetra-O-acetyl-4'-carbobenzoxy-4'-demethyl-epipodophyllotoxin-$\beta$-D-glucoside has a melting point of 167–169°, $[\alpha]_D^{20}=-46.6°$ (c.=0.686 in $CHCl_3$).

The carbobenzoxy radical is split off from tetra-O-acetyl-4'-carbobenzoxy-4'-demethyl-epipodophyllotoxin-$\beta$-D-glucoside by dissolving 13.4 g. of this compound in 100 ml. of acetone/ethanol (1:2), adding 0.5 ml. of glacial acetic acid and 2 g. of palladium/charcoal (10% of Pd) and hydrogenating at 20°. The catalyst is subsequently filtered off, is washed with a warm mixture of acetone/methanol and the filtrate is concentrated by evaporating in a vacuum. 100 ml. of boiling ethanol are poured onto the residue, the mixture is allowed to crystallize and after filtering with suction and washing with methanol the crystals are dried in a vacuum. Pure tetra-O-acetyl-4'-demethyl-epipodophyllotoxin-$\beta$-D-glucoside crystallizes in the form of fine needles having a melting point of 225–227°, $[\alpha]_D^{21}=-64.4°$ (c.=1.024 in chloroform).

EXAMPLE 7.—4'-demethyl-epipodophyllotoxin-$\beta$-D-glucoside 2.0 g. of the tetra-O-acetyl-4'-demethyl-epipodophyllotoxin-$\beta$-D-glucoside obtained in accordance with Example 6 and 1 g. of anhydrous zinc acetate are heated at reflux in 30 ml. of absolute methanol for 25 hours. The resulting white precipitate is subsequently dissolved by the addition of a few ml. of glacial acetic acid and by heating slightly, the solvent is removed in a vacuum at 40° and the residue taken up in 50 ml. of chloroform/butanol (4:1). The organic phase is washed twice, each time with 10 ml. of water, is dried over sodium sulphate and concentrated by evaporating in a vacuum and the residue is chromatographed on silica gel. Non-polar material is first eluted and then pure 4'-demethyl-epipodophyllotoxin-$\beta$-D-glucoside with water-saturated isopropyl acetate/methanol (9:1). The individual fractions are examined by thin layer chromatography on silica gel plates using water-saturated isopropyl acetate/methanol (4:1) as eluant and the glucoside fractions are combined and crystallized twice from methanol. 4'-demethyl-epipodophyllotoxin-$\beta$-D-glucoside has a melting point of 222–230°, another crystalline form thereof a melting point of 262–264°, $[\alpha]_D^{21}=-88°$ (c.=0.507 in methanol).

EXAMPLE 8.—4'-demethyl-epipodophyllotoxin-$\beta$-D-benzylidene-glucoside 1 g. of dried 4'-demethyl-epipodophyllotoxin-$\beta$-D-glucoside is dissolved in 20 ml. of pure benzaldehyde and after the addition of 0.5 g. of anhydrous zinc chloride shaking on a machine is effected at 20° for 5–6 hours in the absence of moisture. The course of the reaction is continuously traced by thin layer chromatography on silica gel plates and chloroform containing 6% of methanol as eluant. In order to make the compound visible the plates are sprayed with a 1% solution of cerium-(IV)-ammonium nitrite in 50% sulphuric acid and heating is subsequently effected to 100–120°. The condensation product is worked up by adding chloroform to the clear, red-brown coloured reaction solution and shaking out with water. The aqueous phase is again extracted twice with chloroform. All the chloroform phases are combined, washed twice with water, dried over sodium sulphate and the solvent is evaporated in a vacuum. The still adhering benzaldehyde is removed by triturating the resulting oily residue with pentane until a powdery product is obtained. For further purification the benzylidene derivative is taken up in 10 ml. of acetone and the acetone solution is added dropwise whilst stirring to 100 ml. of pentane, whereby a light yellow or white coloured precipitate is obtained. The crude product may be purified by chromatography on silica gel columns. For this purpose a solution as concentrated as possible of 1 g. of the crude benzylidene derivative in a mixture of chloroform and 2% of methanol is filtered onto a column of 200 g. of silica gel and elution is effected with the same solvent mixture. The fractions which are uniform in accordance with thin layer chromatography are combined and reprecipitated from acetone/pentane. 4'-demethyl-epipodophyllotoxin-$\beta$-D-benzylidene-glucoside is obtained as a white powder having a melting point of 182–185°. After recrystallization from absolute ethanol crystals, having a melting point of 245–246°, are obtained. Optical rotation: $[\alpha]_D^{20}=-99°$ (c.=0.63 in methanol) and −104° (c.=0.52 in chloroform).

EXAMPLE 9.—Epipodophyllotoxin-benzylidene-$\beta$-D-glucoside. By condensation of epipodophyllotoxin-$\beta$-D-glucoside with benzaldehyde in the presence of anhydrous $ZnCl_2$ as catalyst 7.5 g. of dry epipodophyllotoxin-$\beta$-D-glucoside are dissolved in 143 ml. of benzaldehyde and 3.68 g. of anhydrous $ZnCl_2$ are added. The mixture is stirred at room temperature for one hour in the absence of air and moisture. After this time starting material is no longer detected in the thin layer chromatogram (eluant: chloroform containing 6% of methanol). The reaction mixture is diluted with 400 ml. of chloroform and subsequently shaken out with 400 ml. of water. The water extract is washed twice, each time with 400 ml. of chloroform and the combined organic phases are again shaken out twice, each time with 150 ml. of water, dried over sodium sulphate and concentrated by evaporation. The residue is dissolved in the eluant and adsorbed on a column of 500 g. silica gel "Merck." The excess of benzaldehyde is first separated by elution with chloroform. The eluates with chloroform containing 2% of methanol yield 8.5 g. of benzylidene derivative, which is uniform in accordance with thin layer chromatography. For analysis the compound is dissolved in 25 ml. of chloroform and this solution is added dropwise whilst stirring to 250 ml. of n-hexane. Epipodophyllotoxin-benzylidene-$\beta$-D-glucoside is obtained as a light yellow, amorphous powder, having a melting point of 166–170°, $[\alpha]_D^{21}=-101.2°$ (c.=0.6 in chloroform).

EXAMPLE 10.—Epipodophyllotoxin-benzylidene-$\beta$-D-glucoside. By condensation of epipodophyllotoxin-$\beta$-D-glucoside with benzaldehyde in the presence of a Dowex ion exchange resin as catalyst 1.0 g. of finely pulverized epipodophyllotoxin-$\beta$-D-glucoside (which has been dried at 90° in a high vacuum for 2 hours) is dissolved in 20 ml. of pure benzaldehyde and 2 g. of Dowex powder WX 2 are added. The air in the flask is displaced by introducing nitrogen and the reaction mixture is stirred with a magnetic stirrer in the absence of moisture. The course of the condensation reaction is traced by thin layer chromatography on silica gel plates [eluant: (a) chloroform+6% methanol, (b) chloroform/methanol/water (70:25:5)]. After a reaction time of 60 minutes the initially turbid solution becomes clear and after 2 hours the reaction is completed.

Working up is effected by filtering off the catalyst from the yellowish solution and subsequently washing well with choroform. The filtrate is diluted with 400 ml. of chloroform and shaking out is effected thrice, each time with 25 ml. of water (the last water used for washing has a pH of 5). The organic phase is dried with sodium sulphate and the solvent removed at 60° in a vacuum. A light yellow oil is obtained which is purified on 75 g. of silica gel "Merck" (grain size 0.05–0.20 mm.). After separating the benzaldehyde by elution with chloroform, the compound is eluted with chloroform containing 2% of methanol. Chromatography yields the amorphous benzylidene derivative which is completely uniform in accordance with thin layer chromatography. For analysis the compound is dissolved in 5 ml. of acetone and added dropwise whilst stirring to 75 ml. of pentane. Epipodophyllotoxin-benzylidene-β-D-glucoside is obtained as a colourless, amorphous powder, having a melting point of 165–170°, $[\alpha]_D^{22} = -101.1°$ (c.=0.792 in chloroform).

EXAMPLE 11.—Epipodophyllotoxin - benzylidene - β-D-glucoside. By condensation of epipodophyllotoxin-β-D-glucoside with benzaldehyde in the presence of p-toluenesulphonic acid as catalyst 1.0 g. of dry epipodophyllotoxin-β-D-glucoside is suspended in 20 ml. of nitromethane, 6 ml. of benzaldehyde and 100 mg. of p-toluenesulphonic acid are subsequently added. The mixture is stirred at room temperature in the absence of air and moisture. After a reaction time of 25 minutes a clear, colourless solution results. The reaction is traced by thin layer chromatography (eluant: (a) chloroform+6% of methanol, (b) chloroform/methanol/water (70:25:5) and development with 0.2% cerium-IV-sulphate in 50% sulphuric acid). After 1½ hours the reaction stops and aside from starting material only one main spot may be detected in the thin layer chromatogram. Working up is effected by diluting the reaction solution with 450 ml. of chloroform and subsequently shaking out thrice, each time with 50 ml. of water. The water used for the washings is again washed twice, each time with 30 ml. of chloroform, the combined organic phases are then dried over sodium sulphate and concentrated by evaporation in a vacuum. The residue is adsorbed on a column of 75 g. of silica gel "Merck." Unconverted benzaldehyde may be removed by elution with chloroform. Elution with chloroform containing 2% of methanol yields the benzylidene derivative which is uniform in accordance with thin layer chromatography. For analysis the compound is dissolved in 5 ml. of acetone and this solution is added dropwise whilst stirring to 75 ml. of pentane. Epipodophyllotoxin-benzylidene-β-D-glucoside is obtained in the form of a colourless, amorphous powder, having a melting point of 166–171°, $[\alpha]_D^{22} = -98.9°$ (c.=0.918 in chloroform).

EXAMPLE 12.—Epipodophyllotoxin - benzylidene - β-D-glucoside. By methylation of 4'-demethyl-epipodophyllotoxin-benzylidene-β-D-glucoside with diazomethane 400 mg. of 4'-demethyl-epipodophyllotoxin-benzylidene-β-D-glucoside are dissolved in 8 ml. of dioxane/methanol (9:1) and a solution of diazomethane in ether is added dropwise portionwise. The course of methylation (which is effected in the dark and at room temperature) is traced by thin layer chromatography on silica gel plates with cyclohexane/methyl ethyl ketone (1:1) containing 2% of methanol as eluant. The spots made visible by spraying with a 0.2% solution of cerium-(IV)-sulphate in 50% sulphuric acid and heating to 130°. Only after 12 days 1 main spot alone may be detected by thin layer chromatography. Working up is effected by removing the solvent in a vacuum. The resulting material is purified by chromatography on a 500-fold amount of silica gel "Merck." Throughout the entire elution cyclohexane/methyl ethyl ketone (10:15) containing 2% of methanol is used as eluant. The fractions which are uniform in accordance with thin layer chromatography are dissolved in 2 ml. of chloroform and precipitated with 50 ml. of n-hexane. Epipodophyllotoxin-benzylidene-β-D-glucoside is obtained in the form of a light yellow, amorphous powder, having a melting point of 166–169°.

What is claimed is:

1. Epipodophyllotoxin-benzylidene - β-D-glucoside of formula:

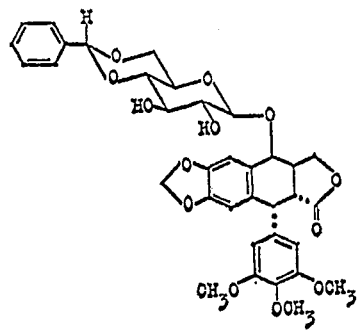

2. Epipodophyllotoxin-β-D-glucoside of formula:

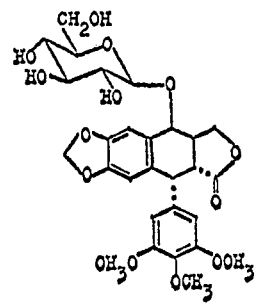

3. Tetra-O-acetyl-epipodophyllotoxin-β-D-glucoside of fomula:

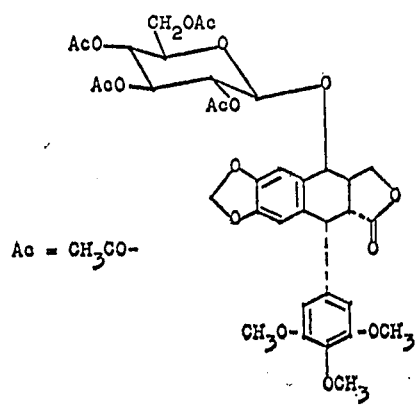

4. A pharmaceutical composition consisting essentially of a therapeutically effective amount of epipodophyllotoxin-benzylidene-β-D-glucoside and a physiologically acceptable, non-toxic, inert carrier.

5. A pharmaceutical composition as claimed in claim 4, in which the amount of epipodophyllotoxin-benzylidene- β-D-glucoside present is suitable for the administration of a daily dose of 1 to 50 mg.

References Cited

UNITED STATES PATENTS

| | | | |
|---|---|---|---|
| 2,049,758 | 8/1936 | Bertsch et al. | 260—210 |
| 2,088,792 | 8/1937 | Johannessohn et al. | 260—210 |
| 2,275,969 | 3/1942 | Kongsted | 260—210 |
| 3,157,634 | 11/1964 | Druey et al. | 260—210 |
| 3,296,245 | 1/1967 | Kaiser et al. | 260—210 |

FOREIGN PATENTS

| | | |
|---|---|---|
| 1,358,040 | 3/1964 | France. |

LEWIS GOTTS, *Primary Examiner.*

JOHNNIE R. BROWN, *Examiner.*